United States Patent [19]
Yigdall

[11] 4,313,722
[45] Feb. 2, 1982

[54] FLUID SHIELDED BURNER TIP FOR USE WITH A GLASS MELTING FURNACE

[75] Inventor: Jeffrey S. Yigdall, Conneaut Lake, Pa.

[73] Assignee: PPG Industries, Inc., Pittsburgh, Pa.

[21] Appl. No.: 188,430

[22] Filed: Sep. 18, 1980

[51] Int. Cl.³ .................... F27D 17/00; B05B 15/00; F23D 11/36; F23C 5/08

[52] U.S. Cl. ................................. 432/1; 65/356; 239/132.3; 239/132.5; 239/424.5; 431/160; 431/181; 432/28; 432/180

[58] Field of Search .............. 432/1, 28, 180; 65/356; 239/132.3, 132.5, 418, 424.5; 431/160, 181

[56] References Cited

U.S. PATENT DOCUMENTS

| | | | |
|---|---|---|---|
| 2,800,175 | 7/1957 | Sharp | 158/117.5 |
| 2,935,127 | 5/1960 | Stalego | 158/99 |
| 2,965,303 | 12/1960 | Jackson | 239/132.5 |
| 3,193,268 | 6/1965 | Robertson et al. | 263/40 |
| 3,224,679 | 12/1965 | Kear et al. | 239/132.3 |
| 3,443,755 | 5/1969 | Bricmont | 239/132.5 |
| 3,515,529 | 6/1970 | Love et al. | 65/356 X |

OTHER PUBLICATIONS

Combustion Tec, Inc. 1979 Brochure, pp. 1, 2, 4, 10 of Bulletin No. 03R.

*Primary Examiner*—John J. Camby
*Attorney, Agent, or Firm*—Lee Patch; Donald Carl Lepiane

[57] ABSTRACT

A burner tip for passing fuel into a glass melting chamber having a fuel passageway and discrete cooling fluid passageways therein for cooling and shielding the burner tip from attack by a hostile gaseous chamber environment. A ceramic collar member is provided for minimizing inspirated air and cooling fluid may be passed through the burner tip during both the firing cycle and off-firing cycle. The burner tip is provided with small diameter cooling fluid passageways to establish a low volume, high velocity flow of cooling fluid sufficient to shield the burner tip from sting-out attack.

12 Claims, 7 Drawing Figures

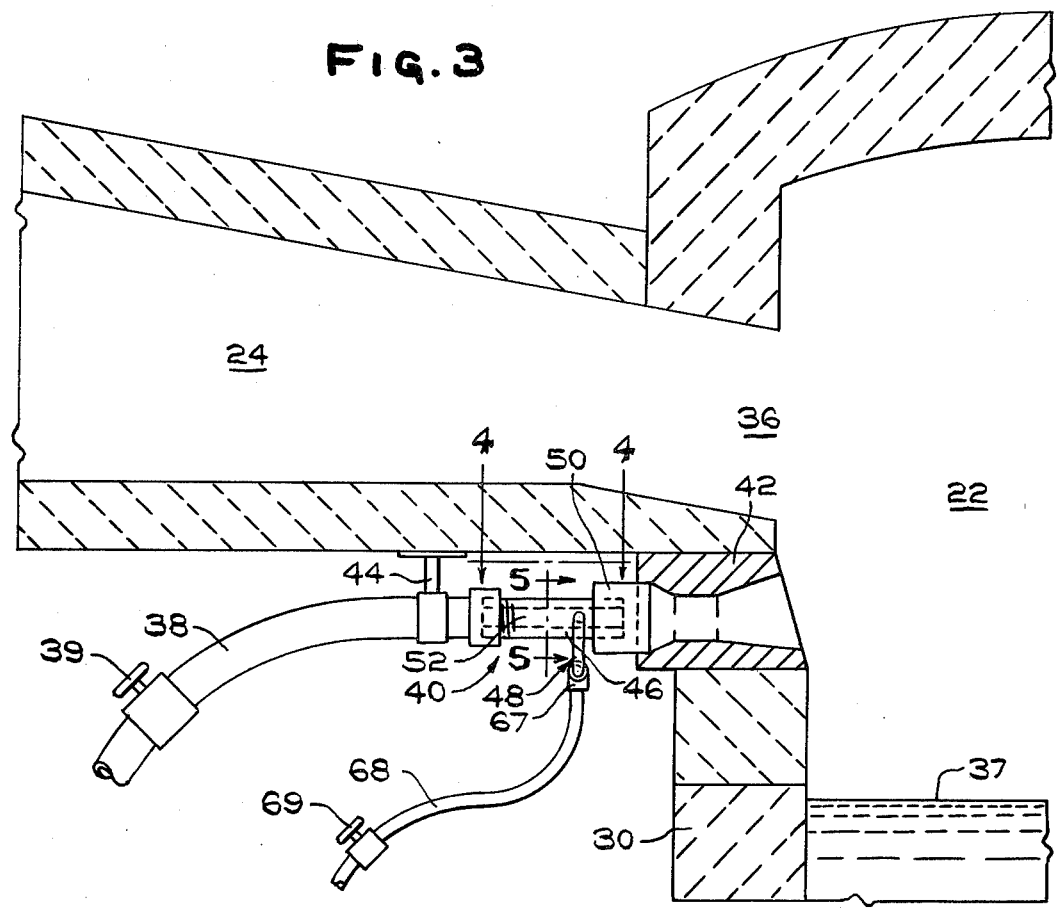
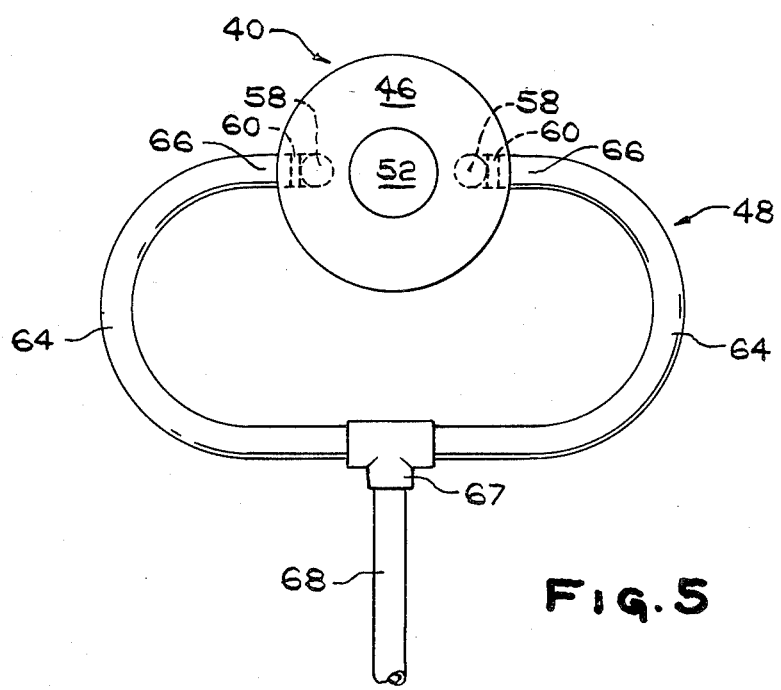

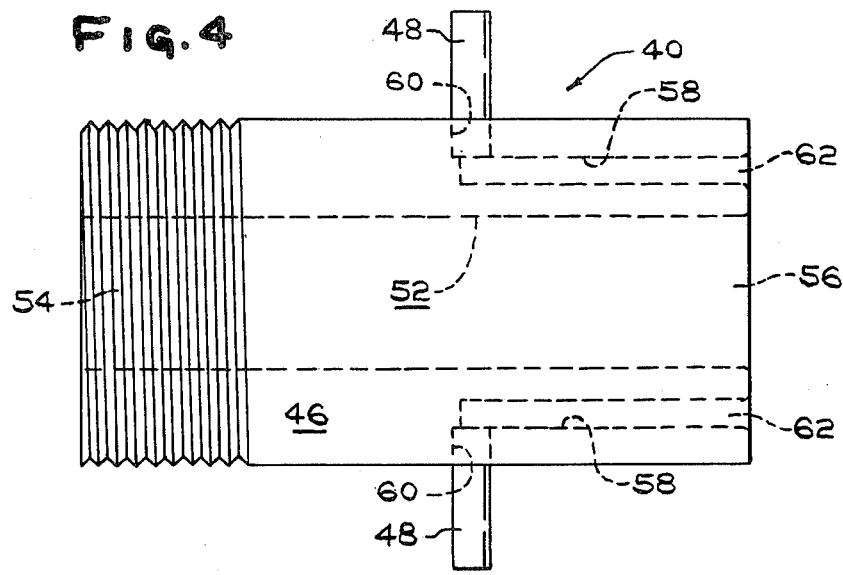
FIG. 4
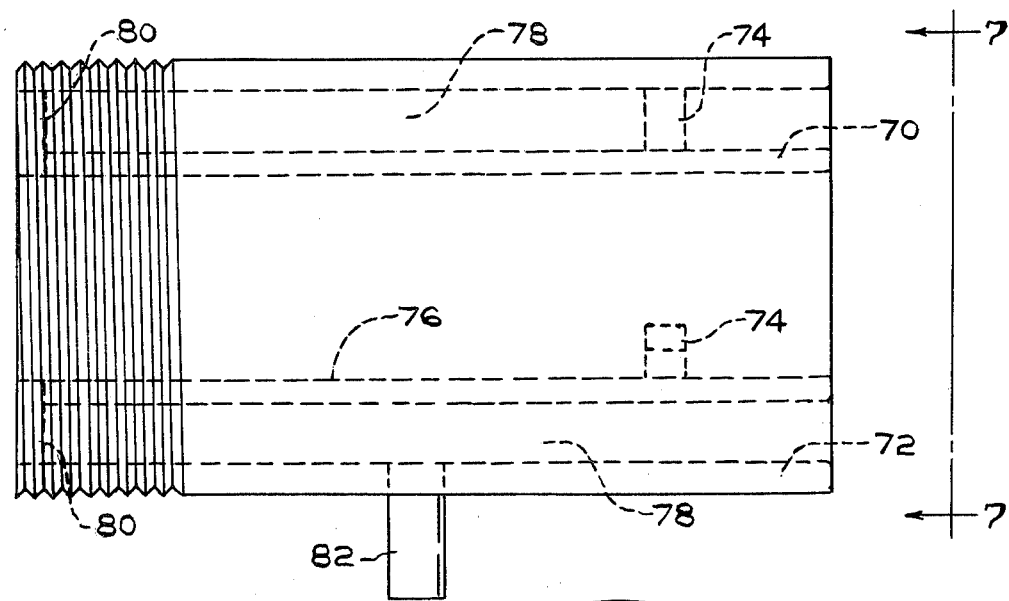
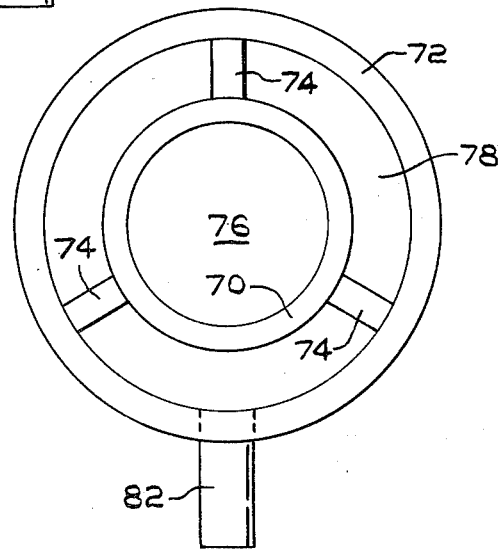
FIG. 6
FIG. 7

FLUID SHIELDED BURNER TIP FOR USE WITH A GLASS MELTING FURNACE

FIELD OF THE INVENTION

This invention relates to burner tips for passing fuel into a chamber, and more particularly to burner tips through which cooling air may be passed to protect the burner tip from a hostile gaseous environment within the chamber.

DISCUSSION OF THE TECHNICAL PROBLEM

In order to minimize energy expenditures, glass melting furnaces commonly utilize a pair of regenerator chambers to recycle exhaust gas heat, each positioned adjacent opposite furnace sidewalls and communicating with the melting chamber by a plurality of ports which enter the melting chamber at a level slightly above the level of the molten glass. Regenerative furnaces of this type operate in alternate cycles, with incoming air passing through the regenerator chamber on one side of the furnace to be preheated, then passing through the ports into the melting chamber. Fuel is added to the incoming air near the port mouth by burner tips positioned either in the port or adjacent the port mouth in the chamber sidewall. Flames issue a considerable distance into the chamber and hot exhaust gases pass into the opposite ports and through the opposite regenerator chamber, where considerable heat is extracted therefrom. After several minutes of operation the cycle is reversed and incoming air is preheated by the previously extracted exhaust gas heat.

Burner tips used in such glass melting furnaces typically are constructed of metal and are positioned adjacent to but not in sealing contact with a refractory block having an aperture therethrough leading into the melting chamber (commonly called a burner block). During the firing cycle of a particular port, a considerable volume of fuel passes at high velocity through the burner tip into the melting chamber, thus tending to cool the burner tip and protect it from the corrosive atmosphere within the chamber. Further cooling is commonly provided by ambient air which is inspirated into the chamber through spaces between the burner tip and burner block by the partial vacuum which is established by the moving fuel.

During the off-firing cycle when the port is employed as an exhaust passage, the burner tips are subjected to extreme temperatures and attack by corrosive gases as a result of sting-out. Sting-out is generally the escape of furnace exhaust products through furnace openings other than exhaust passageways, and consists principally of high temperature sulfate gases containing amounts of gaseous and particulate batch material therein. In the temperature ranges found near the portmouth during the off-firing cycle, sting-out will quickly deteriorate burner tips constructed of common metallic materials. It is important therefore to cool and to shield the burner tips from the effects of sting-out during the off-firing cycle.

Further, because inspirated air is neither preheated nor of a controlled composition, it has become desirable to sealingly engage the burner tip to the burner block to eliminate inspirated air during the firing cycle, to improve energy efficiency. This modification in burner tip usage makes it desirable to be able to cool the burner tips during the firing cycle, as well as during the off-firing cycle.

Combustion Tec, Inc. of Orlando, Fla. markets a burner tip for use with glass regenerative furnaces which features an adjustable orifice through which gaseous fuel passes during the firing cycle and cooling air passes during the off-firing cycle. The burner tip may be sealingly engaged to the burner block to eliminate inspirated air, and a valve interlock system is utilized to prevent cooling air and gaseous fuel from passing simultaneously through the burner tip. This burner tip also utilizes a partially common passageway and orifice for passing the gaseous fuel and cooling air therethrough. Due to the generally large orifice preferred for passing the large volumes of gaseous fuel required in furnace operation, undesirably high volumes of cooling air must be utilized to establish air velocities sufficient to shield the burner tip from the sting-out attack during the off-firing cycle. Utilizing high volumes of cooling air leads to the same energy related problems which the elimination of inspirated air is intended to obviate. Further, the burner tip system has a valve interlock system which prevents cooling air from passing therethrough during the firing cycle and also requires independent external cooling facilities to permit sealing engagement between the burner tip and the burner block. It would be desirable to have a burner tip which can be cooled and shielded from sting-out attack without requiring undesirably high volumes of cooling air. Further it would be desirable to have a burner tip which can be internally cooled during the firing cycle without mixing the gaseous fuel and cooling air in the same orifice.

SUMMARY OF THE INVENTION

The present invention relates to a burner tip used for passing fuel into a chamber which includes a body member, a fuel passageway therein having an input and output for passing the fuel therethrough, and a discrete cooling fluid passageway therein having an output adjacent the fuel passageway output for passing cooling fluid therethrough. Preferably the discrete cooling fluid passageway has cross-sectional area less than the fuel passageway and may be flared at its output to control the flow of cooling fluid. A plurality of discrete cooling fluid passageways may be utilized, preferably two, and a ceramic collar is provided for connecting the output end of the burner tip to the burner block to prevent uncontrolled movement of air into the chamber through the space between the burner tip and burner block.

The invention also relates to a method of heating the interior of a chamber including the steps of passing a gaseous fuel through a burner tip along a first defined path therethrough into the chamber, defined as the firing cycle, then discontinuing the fuel passing step and passing a cooling fluid through the burner tip along at least one second and discrete defined path toward the chamber, defined as the off-firing cycle. Preferably the cooling fluid is passed along its path through the burner tip toward the chamber with a velocity sufficient to shield the burner tip from the hostile gaseous environment which is contained within the chamber. The ratio of the fuel input rate during the firing cycle to the cooling fluid input rate during the off-firing cycle is preferably greater than about 10 and the ratio of the fuel velocity during the firing cycle to the cooling fluid velocity during the off-firing cycle is preferably less than about 10.

The present invention also relates to a method of heating the interior of a chamber in which uncontrolled movement of ambient air is prevented between the burner tip and chamber, i.e. the burner tip is sealingly engaged to the chamber to eliminate inspirated air, and cooling fluid is passed along the at least one second and discrete defined path toward the chamber while the fuel is passed along the first defined path into the chamber.

The present invention provides a burner tip having facilities for cooling and protecting itself from the deteriorating effect of sting-out during the off-firing cycle, while minimizing the amount of non-preheated air which is utilized in doing so. The ceramic collar of the invention permits the burner tip to be conveniently sealingly engaged to the chamber to eliminate inspirated air, and the discrete passageways in the burner tip permit cooling fluid to pass therethrough simultaneously with the passage of fuel, without any intermixing of the fuel and cooling fluid within.

BRIEF DESCRIPTION OF THE DRAWINGS

FIG. 3 is a sectional view taken along line 3—3 of FIG. 1 showing a burner tip assembly incorporating features of the present invention.

FIG. 4 is a view taken along line 4—4 of FIG. 3 having portions removed for purposes of clarity.

FIG. 5 is a elevated sectional view taken along line 5—5 of FIG. 3.

FIG. 6 is a view similar to FIG. 4 of an alternate embodiment of a burner tip incorporating features of the present invention.

FIG. 7 is an end view taken along line 7—7 of FIG. 6.

DESCRIPTION OF THE INVENTION

Figure 1:
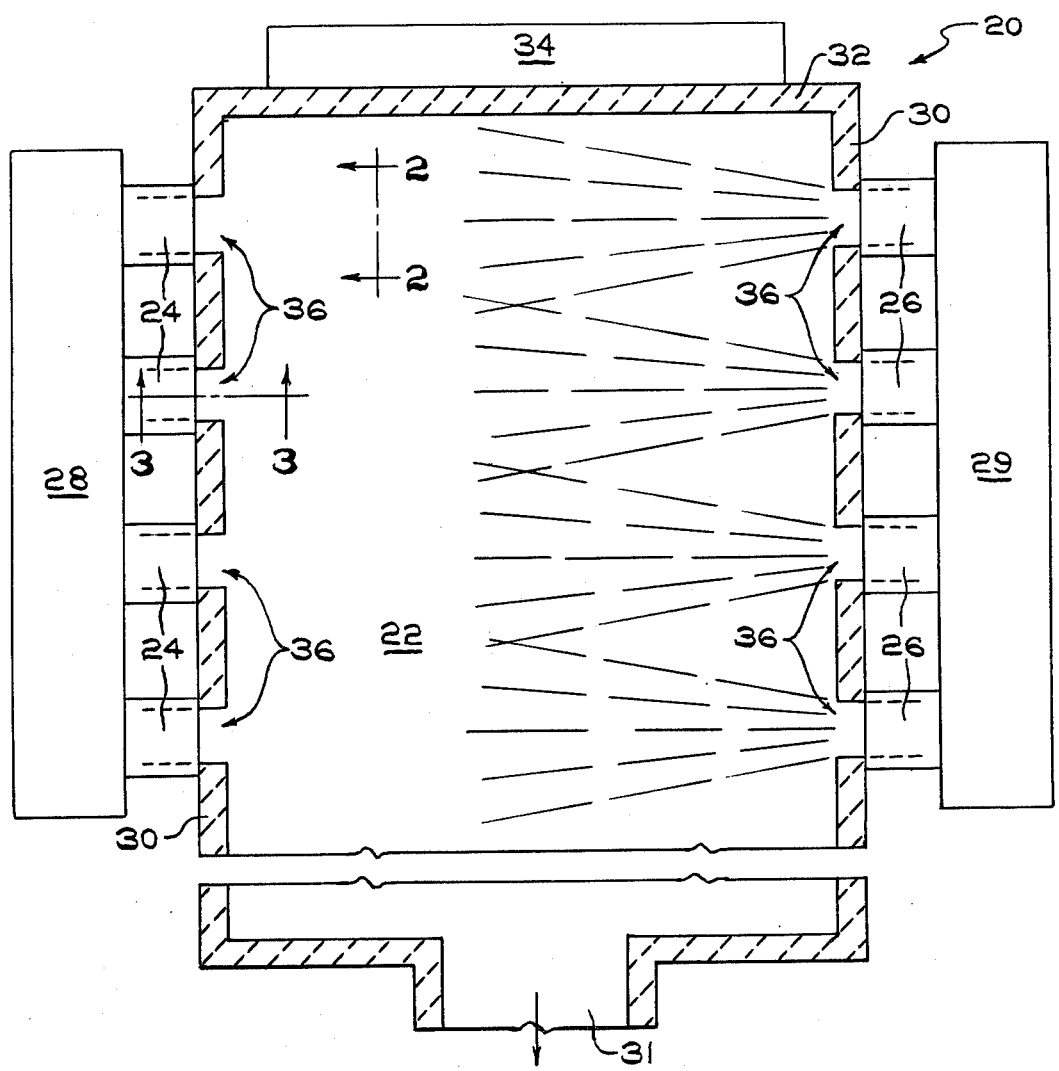
FIG. 1 is a plan view of a glass melting furnace showing right side ports during their firing cycle and left side ports during their exhaust or off-firing cycle.

Referring to FIG. 1, there is shown a regenerative type glass melting furnace 20 of the type known in the glass manufacturing art, including a melting chamber 22, left side ports 24, right side ports 26 and left and right side regenerator chambers 28 and 29 respectively (as shown in FIG. 1). Melting chamber 22 has a refractory bottom (not shown), a refractory roof (not shown), refractory sidewalls 30, refractory exit area 31, and a refractory backwall 32. Glass batch material is pushed through the backwall 32 by a batch feeder 34 into the melting chamber 22 floating upon a pool of molten glass and moves thereacross in the direction of the arrow until it has melted and become a part of the pool of molten glass. Quantities of molten glass are removed from the melting chamber 22 at the exit area 31 to maintain the pool of molten glass at a generally constant depth.

The interior of the melting chamber 22 is heated by the combustion of fuels mixed with sufficient quantities of air. Fuels which may be used in the practice of the invention include gaseous fuels, mixtures of atomized liquid fuels and air, mixtures of powdered fuels and air, or liquid fuels. In a regenerative type furnace 20 of the type shown in FIG. 1, during the first half of the cycle air is passed into the melting chamber 22 from regenerator chamber 29 into ports 26 and therethrough into melting chamber 22, while combustion products are exhausted through ports 24 into regenerator chamber 28, where heat is extracted from the combustion products. During the second half of the cycle the process is reversed, with air passing through regenerator chamber 28 and ports 24 into melting chamber 22, and with combustion products exhausted through ports 26 and regenerator chamber 29. The air is preheated to a substantial degree as it passes through a heated regenerator chamber into the melting chamber 22, thus improving furnace energy efficiency. Hereinafter, ports which are passing air into the melting chamber are in their "firing cycle" and ports passing combustion products are in their "off-firing cycle", e.g., in FIG. 1 ports 26 are in their firing cycle and ports 24 are in their off-firing cycle.

Figure 2:
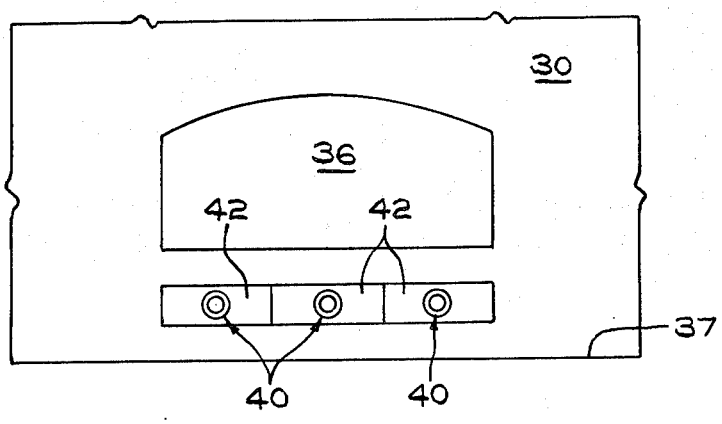
FIG. 2 is a front elevated view taken along line 2—2 of FIG. 1 showing the inside wall portion of a furnace having burner tips incorporating features of the present invention.

Referring to FIGS. 2 and 3, fuel is mixed with the stream of incoming air at a point adjacent the portmouth 36 when the port is in its firing cycle. Although not limiting to the invention, FIGS. 2 and 3 illustrate an underport firing system in which fuel is added to the stream of incoming air just inside the chamber sidewall 30 directly below a downwardly sloping port 24 and above the level of the molten glass 37. As best shown in FIG. 3, the fuel is passed through a fuel supply line 38, through a burner tip 40 incorporating features of the present invention, and through a ceramic burner block 42 into the melting chamber 22. The supply line 38 is conveniently secured to the underside of port 24 by bracket 44, and as shown in FIG. 2, three such assemblies may be positioned adjacent each portmouth 36 to provide improved control over flame geometry.

Referring to FIGS. 3, 4, and 5, the burner tip 40 has a body member 46, a cooling fluid supply yoke 48, and a ceramic collar member 50 (only shown in FIG. 3).

Referring to FIG. 4, the body member 46 incorporating features of the present invention has a fuel passageway 52 extending lengthwise through the cylindrical body member 46 with an input 54 and output 56. The body member 46 preferably has external threads adjacent the input 54 for convenient attachment to the supply line 38 (see FIG. 3).

A pair of cooling fluid passageways 58, preferably smaller in cross section than the passageway 52, are disposed within the wall portions of the body member 46 adjacent to and spaced from, i.e., not in communication with, the fuel passageway 52. Output ends 62 of the passageways 58 and output 56 of fuel passageway 52 terminate at the same surface of the member 46 spaced from each other as shown in FIG. 5. Inputs 60 of passageways 58 are formed in the wall portions of the body member 46 generally transverse to the longitudinal center line of passageways 58 intermediate the input 54 and output 56 of the fuel passageway 52. Although not limiting to the invention, the outputs 62 of passageways 58 may be outwardly flared to advantageously direct the flow of cooling fluid during operation.

Referring to FIGS. 3, 4, and 5, the cooling fluid supply yoke 48 consists of a bifurcated channel member having a pair of hollow conduits 64 with ends 66 generally connectable to the inputs 60 of passageways 58. The conduits 64 are preferably made of a resilient material e.g. steel, and have an equilibrium position, i.e. unbiased position, with respect to one another which is less than or equal to the distance between the inputs 60 of passageways 58. Thus, the supply yoke 48 is conveniently attached to and retained in position upon the body member 46 by biasing the conduits 64 apart and inserting their ends 66 within the inputs 60 of passageways 58. Thereafter the resiliency of the conduits 64 provides a spring loading to retain the supply yoke 48 in position. The junction 67 of conduits 64 is conveniently attached to a source of cooling fluid by a cooling fluid supply line 68.

Fuel flow to the burner tip 40 is controlled by a valve 39 positioned in fuel supply line 38, and cooling fluid flow is controlled by a valve 69 positioned in the cooling fluid supply line 68.

Although not limiting to the invention, the ceramic collar member 50, as shown in FIG. 3, may be formed of a silica or alumina-silica refractory material and preferably is cylindrical in shape with a central orifice having a diameter slightly greater than or equal to the outer diameter of the body member 46 at operating temperatures. The ceramic collar member 50 slips over the output end of the body member 46 at one end and engages the burner block 42 in any convenient manner at its other end to minimize inspirated air therebetween during the firing cycle.

Referring now to FIGS. 6 and 7, an alternate embodiment of a burner tip according to the present invention is shown, consisting of an inner tubular member 70 disposed concentrically within an outer tubular member 72 by spacers 74, thus forming an inner passageway 76 within the inner tubular member 70 which extends from an input to an output end and an outer passageway 78 between the inner tubular member 70 and outer tubular member 72. The outer tubular member 72 is externally threaded at the input end for convenient attachment to a fuel supply line 38 (see FIG. 3) which provides fuel for passage through the inner passageway 76. The outer passageway 78 is maintained in non-communicating relation to the inner passageway 76 by a toroidal member 80 which is rigidly attached between the inner and outer tubular members 70 and 72 at their input ends. A hollow connector 82 extends through the sidewall of the outer tubular member 72 into the outer passageway 78 to connect the outer passageway 78 to a source of cooling fluid (not shown).

Referring to FIGS. 3 and 4, a mode of operation will be described in which the body member 46 is positioned in spaced relation to the burner block 42 with the ceramic collar member 50 positioned therebetween. When the port 24 is in its firing cycle large volumes of preheated air pass at high velocity through the portmouth 36, where it mixes with fuel from the fuel passageway 52 as it enters the chamber 22. Because the ceramic collar member 50 effectively eliminates inspirated air between the burner tip 40 and burner block 42, it is beneficial to pass cooling fluid through the passageways 58 toward the burner block 42 during the firing cycle to resupply a portion of the cooling effect previously supplied to the burner tip by the inspirated air.

During the off-firing cycle of port 24, the valve 39 controlling the flow of fuel is closed and the port 24 acts as an exhaust passage, thus establishing a positive pressure condition adjacent the burner block 42. The positive pressure tends to propel the high temperature sulfate gases within the chamber 22 through the burner block 42 to the adjacent end of the burner tip 40, i.e., produce a sting-out attack. In the practice of the present invention cooling fluid is passed through the passageways 58 toward the burner block 42 to shield the end of the burner tip from such sting-out. It is desirable to minimize the volume of cooling fluid entering the melting chamber 22 in order to optimize the energy efficiency of the system while maintaining sufficiently high velocities of cooling fluid to block the sting-out. The present invention provides this capability by passing cooling fluid through discrete passageways not in communication with and of smaller cross-sectional area than the fuel passageway 52, thus permitting a relatively low volume, high velocity cooling fluid flow. Beneficial results may be achieved by practicing the invention such that the ratio of the fuel passage rate during the firing cycle to the cooling fluid passage rate during the off-firing cycle is greater than about 10, i.e., at least ten times as much fuel passes through the burner tip during the firing cycle than cooling fluid during the off-firing cycle. Further, it is preferred to operate such that the ratio of the fuel velocity during the firing cycle to the cooling fluid velocity during the off-firing cycle is less than about 10, i.e., the cooling fluid passes through the burner tip with at least one tenth the velocity of the fuel. Accordingly, it may be preferred to adjust the flow of cooling fluid between firing and off-firing cycles to optimize the effect of the cooling fluid flow during each segment. In this manner the burner tip 40 may be cooled during its firing cycle and both cooled and shielded from sting-out during its off-firing cycle.

In applications in which it is not preferred to eliminate inspirated air during the firing cycle, it will be appreciated that the ceramic collar member 50 need not be utilized. In such a mode of operation the inspirated air may sufficiently cool the burner tip to eliminate the need for cooling fluid flow during the firing cycle, in which case the valve 69 may be closed during the firing cycle and opened only during the off-firing cycle to cool and shield the burner tip 40 from sting-out.

DESCRIPTION OF THE PREFERRED EMBODIMENT

Referring to FIGS. 3 and 4, in the preferred embodiment of the present invention a burner tip 40 is positioned by bracket 44 below a downwardly sloping port adjacent to an apertured burner block 42. The burner tip has a body member 46 formed of mild steel in a cylindrical configuration. A fuel passageway 52 having a diameter of 1.6 inches (4.0 cm) extends along the longitudinal centerline of the body member 46. A pair of generally parallel cooling fluid passageways 58 are formed in the wall portions of the body member 46 on opposite sides of the passageway 52 having diameters of about ¼ inch (0.6 cm) with 1/16 inch (0.15 cm) flares at their output ends.

In operation, the burner tip passes gaseous fuel into the melting chamber at a rate of about 10,000 cubic feet per hour (CFH) (about 276 cubic meters/hour) during the firing cycle, the gaseous fuel thus traveling therethrough at about 250 feet per second (75 meters/second). With the ceramic collar 50 absent, each of the passsageways 58 are idle during the firing cycle and pass cooling fluid towards burner block 42 during the off-firing cycle at a rate of about 200 CFH (5.5 cubic meter/hour) with a fluid velocity of about 163 feet per second (49 meters per second) to shield the burner tip from the effects of sting out. With the ceramic collar 50 in position the passageways 58 pass cooling fluid continuously during operation as previously discussed.

It is to be understood that the present invention is not limited by the underport firing, downwardly sloped port specific embodiment used for exemplary purposes herein, as the invention may be practiced with other known melting chamber configurations with beneficial results.

I claim:

1. Apparatus for passing fuel into a chamber, the interior of said chamber defined by the interior surfaces of wall portions and port walls communicating with said wall portions, said port walls defining ports for passing combustion air into said chamber during a firing cycle and passing combustion products out of said chamber during an off-firing cycle, said chamber including at least one fuel input passageway formed in said wall portions or said port walls and extending between the interior and the exterior of said chamber comprising:
 a burner tip having a body member, said body member having an input end, an output end, and fuel passsage means therebetween;
 means for mounting said burner tip with said output end thereof adjacent said at least one fuel input passageway, spaced from the interior of said chamber;
 means for directing fuel through said fuel passage means of said burner tip into said fuel input passageway and therethrough to the interior of said chamber during said firing cycle;
 discrete cooling fluid passage means in the body member of said burner tip, said discrete cooling fluid passage means having an output adjacent said fuel input passageway; and
 means for directing fluid through said discrete cooling fluid passage means toward said fuel input passageway during said off-firing cycle to shield the body member of said burner tip from corrosive combustion products which tend to escape the interior of said chamber through said fuel input passageway.

2. The apparatus as set forth in claim 1 wherein said fuel passage means is defined by body portions of said body member, and wherein said discrete cooling fluid passage means is formed within said body portions.

3. The apparatus as set forth in claim 2 wherein said discrete cooling fluid passage means has a cross-sectional area less than the cross-sectional area of said fuel passage means.

4. The apparatus as set forth in claim 3 wherein said discrete cooling fluid passage means is flared at its output.

5. The apparatus as set forth in claim 4 wherein said discrete cooling fluid passage means further comprises:
 a plurality of discrete cooling fluid passage means having outputs adjacent the output of said fuel passage means, and wherein at least one of said plurality of discrete cooling fluid passage means is flared at its output.

6. The apparatus as set forth in claim 1 or 5 further comprising:
 ceramic collar means to interconnect the output end of said body member to said fuel input passageway to prevent uncontrolled movement of ambient air between said output end and said fuel input passageway.

7. The apparatus as set forth in claim 1 or 6 wherein said chamber is a glass melting furnace and wherein said discrete cooling fluid passage means comprises a pair of discrete cooling fluid passage means each having orifices defining inputs spaced from one another in the body portion of said body member, and further comprising:
 cooling fluid supply means; and
 spring loaded connection means for connecting said cooling fluid supply means and said spaced inputs of said pair of discrete cooling fluid passage means, said connector means including a bifurcated channel member having a pair of conduits each with end portions insertable within the spaced inputs of said pair of discrete cooling fluid passage means.

8. A method of heating the interior of a chamber, the interior of said chamber defined by the interior surfaces of wall portions and port walls communicating with said wall portions, said port walls defining ports for passing combustion air into said chamber during a firing cycle and passing combustion products out of said chamber during an off-firing cycle, said chamber including at least one fuel input passageway formed in said wall portions or said port walls and extending between the interior and the exterior of said chamber, comprising the steps of:
 mounting a burner tip spaced from the interior of said chamber, said burner tip having an inlet end, an outlet end adjacent said fuel input passageway of said chamber, and a fuel passage between said inlet end and said outlet end;
 directing fuel along said fuel passage of said burner tip into said fuel input passageway of said chamber and therethrough into the interior of said chamber during said firing cycle;
 discontinuing said fuel directing step at the end of said firing cycle; and
 passing a cooling fluid through said burner tip along a discrete cooling fluid passage therein toward the fuel input passageway of said chamber during said off-firing cycle to shield said burner tip from corrosive combustion products which tend to escape the interior of said chamber through said fuel input passageway during said off-firing cycle.

9. The method as set forth in claim 8 wherein the ratio of the fuel passage rate during said fuel directing step to the cooling fluid passage rate during said fluid passing step is greater than about 10.

10. The method as set forth in claim 9 wherein the ratio of the fuel velocity during said fuel directing step to the cooling fluid velocity during said fluid passing step is less than about 10.

11. The method as set forth in claim 8 or 10 further comprising the steps of:
 preventing uncontrolled movement of ambient air into said fuel input passageway during said firing cycle from the exterior of said chamber; and
 passing a cooling fluid through said burner tip along said discrete cooling fluid passage while practicing said fuel directing step.

12. A burner tip for passing fuel into a chamber, comprising:
 a body member;
 a fuel passage means in said body member, said fuel passage means having an input and output for passing the fuel into and out of said body member;
 a pair of discrete cooling fluid passage means in said body member, said discrete cooling fluid passage means having an output adjacent the output of said fuel passage means for passing cooling fluid through said body member and having orifices defining inputs spaced from one another in the wall portions of said body member, wherein said body member is an elongated body member having the outputs of said fuel passage means and said discrete cooling fluid passage means at a first end portion;

ceramic collar means to interconnect said first end portion of said body member to said chamber to prevent uncontrolled movement of ambient air between said first end portion and said chamber;

cooling fluid supply means; and spring loaded connector means for connecting said cooling fluid supply means and said spaced inputs of said pair of discrete cooling fluid passage means, said connector means including a bifurcated channel member having a pair of conduits each with end portions insertable within the spaced inputs of said pair of discrete cooling fluid passage means.

* * * * *